(12) United States Patent
Lee

(10) Patent No.: US 6,431,651 B1
(45) Date of Patent: Aug. 13, 2002

(54) NECK SUPPORT DEVICE FOR A VEHICLE CAR SEAT

(76) Inventor: Peggy A. Lee, 2047 Ryan Way, Winter Haven, FL (US) 33884

( * ) Notice: Subject to any disclaimer, the term of this patent is extended or adjusted under 35 U.S.C. 154(b) by 0 days.

(21) Appl. No.: 09/751,743

(22) Filed: Dec. 29, 2000

(51) Int. Cl.[7] ................................................. A47C 7/36
(52) U.S. Cl. .................................. 297/397; 297/452.41
(58) Field of Search ................................. 297/391, 397, 297/452.41, DIG. 3

(56) References Cited

U.S. PATENT DOCUMENTS

| 4,114,948 A | | 9/1978 | Perkey |
|---|---|---|---|
| 4,447,922 A | * | 5/1984 | Brochu |
| 4,738,488 A | | 4/1988 | Camelio |
| 5,015,036 A | * | 5/1991 | Fergie |
| 5,129,705 A | | 7/1992 | Wray |
| 5,330,255 A | * | 7/1994 | Stawicki |
| D360,554 S | | 7/1995 | Righini |
| 5,538,323 A | | 7/1996 | Henkel |
| 5,964,504 A | | 10/1999 | Hogan et al. |
| 6,033,023 A | * | 3/2000 | Strassner et al. |
| 6,123,389 A | * | 9/2000 | O'Connor et al. |

* cited by examiner

Primary Examiner—Milton Nelson, Jr.

(57) ABSTRACT

A neck support device for a vehicle car seat for supporting a user's neck while the user is sleeping in a vehicle. The neck support device for a vehicle car seat includes a pillow-like member having a front, back, top, and bottom and further having a definite thickness and being adapted to rest between a top of a vehicle car seat and a vehicle head rest; and also includes a cushioning mechanism for cushioning the pillow-like member.

9 Claims, 3 Drawing Sheets

NECK SUPPORT DEVICE FOR A VEHICLE CAR SEAT

BACKGROUND OF THE INVENTION

1. Field of the Invention

The present invention relates to a neck support for a vehicle and more particularly pertains to a new neck support device for a vehicle car seat for supporting a user's neck while the user is sleeping in a vehicle.

2. Description of the Prior Art

The use of a neck support for a vehicle is known in the prior art. More specifically, a neck support for a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,114,948; 5,538,323; 5,129,705; 5,964,504; 4,738,488; and U.S. Pat. No. Des. 360,544.

While these devices fulfill their respective, particular objectives and requirements, the aforementioned patents do not disclose a new neck support device for a vehicle car seat. The inventive device includes a pillow-like member having a front, back, top, and bottom and further having a definite thickness and being adapted to rest between a top of a vehicle car seat and a vehicle head rest; and also includes a cushioning mechanism for cushioning the pillow-like member.

In these respects, the neck support device for a vehicle car seat according to the present invention substantially departs from the conventional concepts and designs of the prior art, and in so doing provides an apparatus primarily developed for the purpose of supporting a user's neck while the user is sleeping in a vehicle.

SUMMARY OF THE INVENTION

In view of the foregoing disadvantages inherent in the known types of neck support for a vehicle now present in the prior art, the present invention provides a new neck support device for a vehicle car seat construction wherein the same can be utilized for supporting a user's neck while the user is sleeping in a vehicle.

The general purpose of the present invention, which will be described subsequently in greater detail, is to provide a new neck support device for a vehicle car seat which has many of the advantages of the neck support for a vehicle mentioned heretofore and many novel features that result in a new neck support device for a vehicle car seat which is not anticipated, rendered obvious, suggested, or even implied by any of the prior art neck support for a vehicle, either alone or in any combination thereof.

To attain this, the present invention generally comprises a pillow-like member having a front, back, top, and bottom and further having a definite thickness and being adapted to rest between a top of a vehicle car seat and a vehicle head rest; and also includes a cushioning mechanism for cushioning the pillow-like member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new neck support device for a vehicle car seat which has many of the advantages of the neck support for a vehicle mentioned heretofore and many novel features that result in a new neck support device for a vehicle car seat which is not anticipated, rendered obvious, suggested, or even implied by any of the prior art neck support for a vehicle, either alone or in any combination thereof.

It is another object of the present invention to provide a new neck support device for a vehicle car seat which may be easily and efficiently manufactured and marketed.

It is a further object of the present invention to provide a new neck support device for a vehicle car seat which is of a durable and reliable construction.

An even further object of the present invention is to provide a new neck support device for a vehicle car seat which is susceptible of a low cost of manufacture with regard to both materials and labor, and which accordingly is then susceptible of low prices of sale to the consuming public, thereby making such neck support device for a vehicle car seat economically available to the buying public.

Still yet another object of the present invention is to provide a new neck support device for a vehicle car seat which provides in the apparatuses and methods of the prior art some of the advantages thereof, while simultaneously overcoming some of the disadvantages normally associated therewith.

Still another object of the present invention is to provide a new neck support device for a vehicle car seat for supporting a user's neck while the user is sleeping in a vehicle.

Yet another object of the present invention is to provide a new neck support device for a vehicle car seat which includes a pillow-like member having a front, back, top, and bottom and further having a definite thickness and being adapted to rest between a top of a vehicle car seat and a vehicle head rest; and also includes a cushioning mechanism for cushioning the pillow-like member.

Still yet another object of the present invention is to provide a new neck support device for a vehicle car seat that prevents neck cramps and prevents one's head from being moved about due to the motion of the vehicle.

Even still another object of the present invention is to provide a new neck support device for a vehicle car seat that is easy and convenient to quickly secure the neck support device between the top of the vehicle seat and the head rest member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
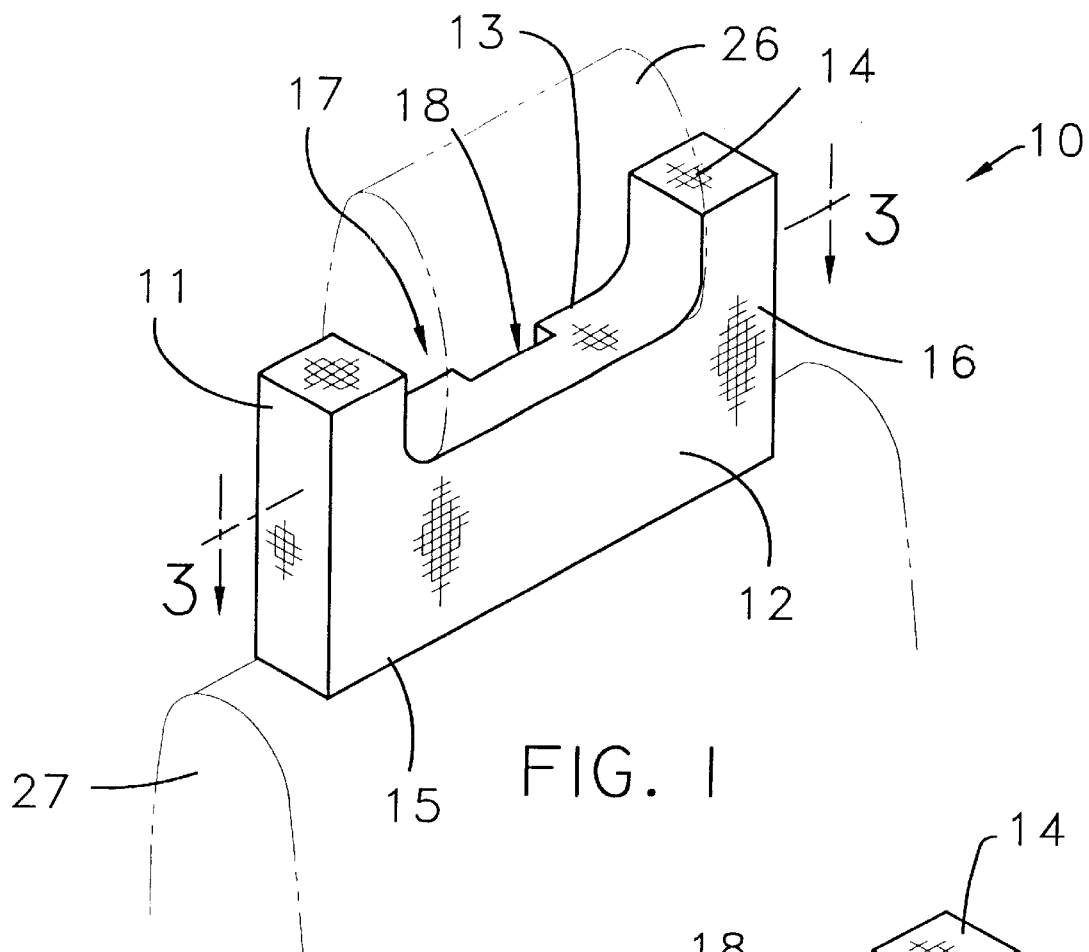
FIG. 1 is a front perspective view of a first embodiment of a new neck support device for a vehicle car seat according to the present invention.
Figure 2:
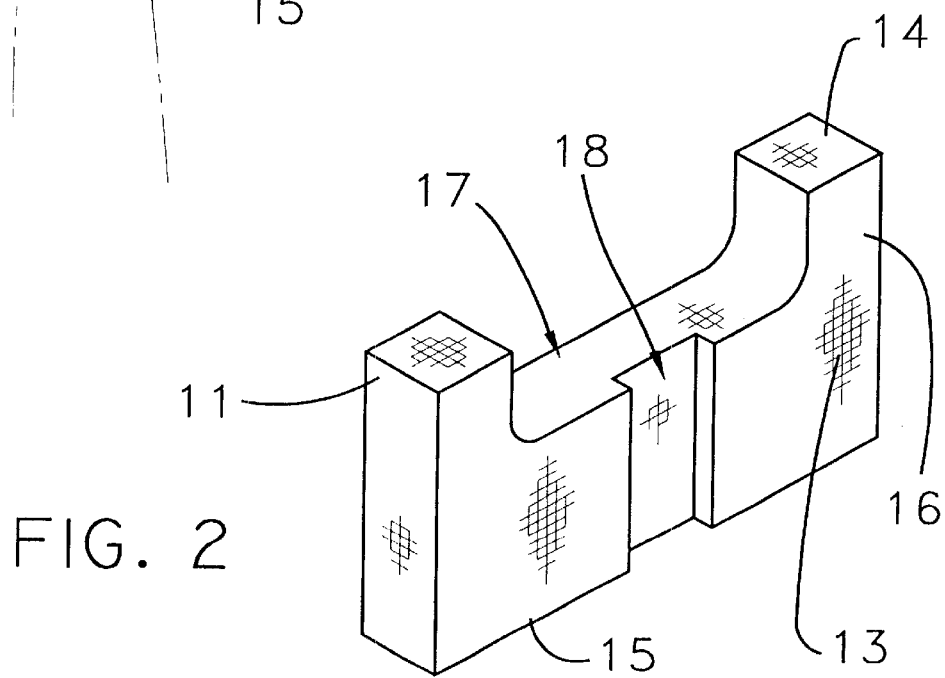
FIG. 2 is a rear perspective view of the first embodiment of the present invention.
Figure 3:
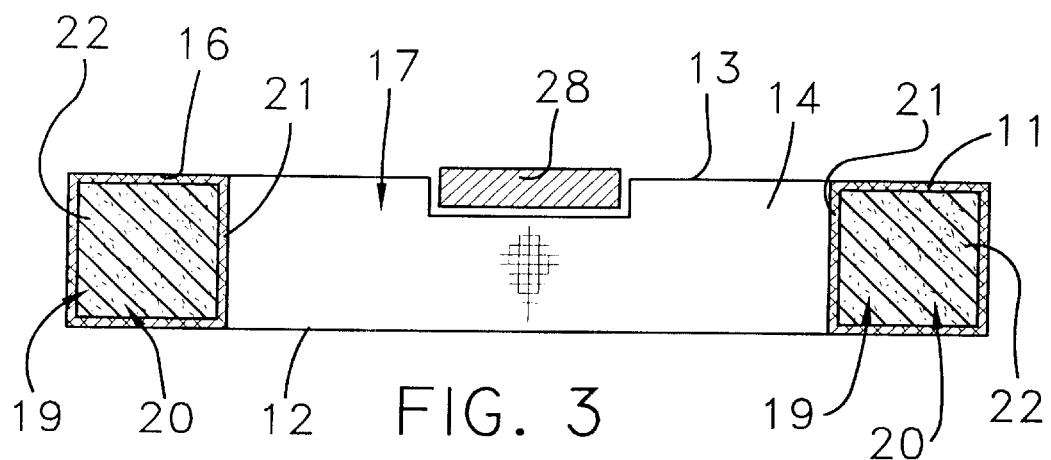
FIG. 3 is a cross-sectional view of the present invention.
Figure 4:
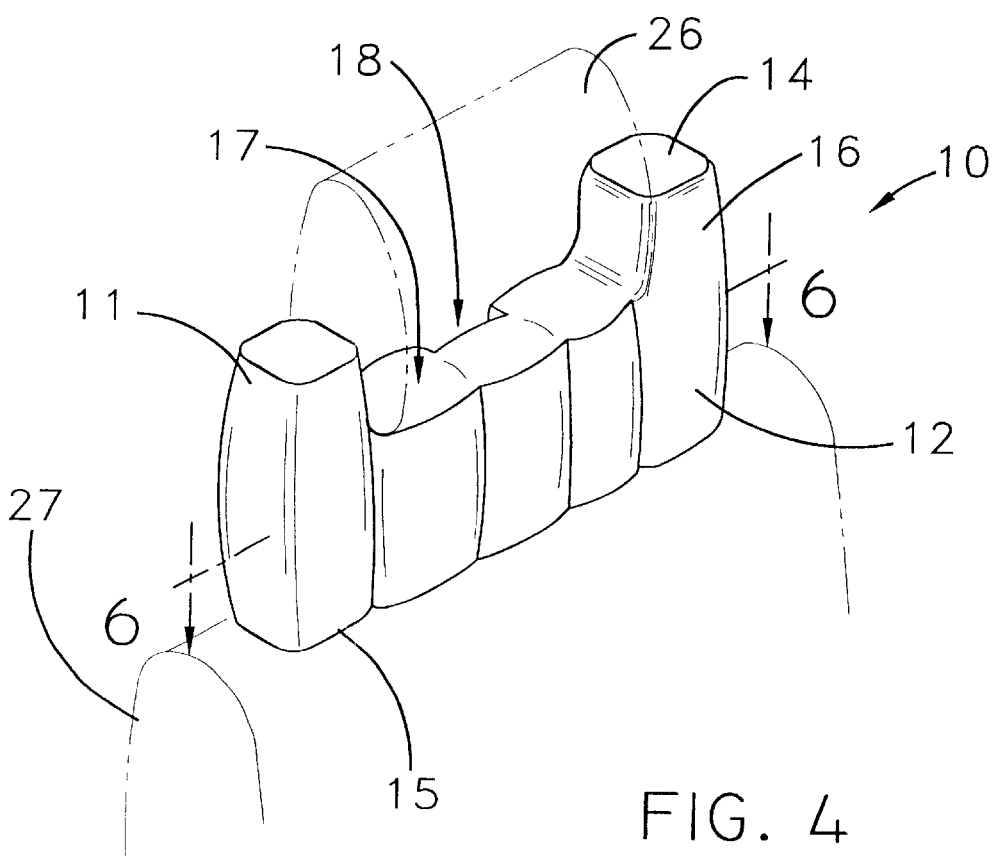
FIG. 4 is a front perspective view of a second embodiment of the present invention.
Figure 5:
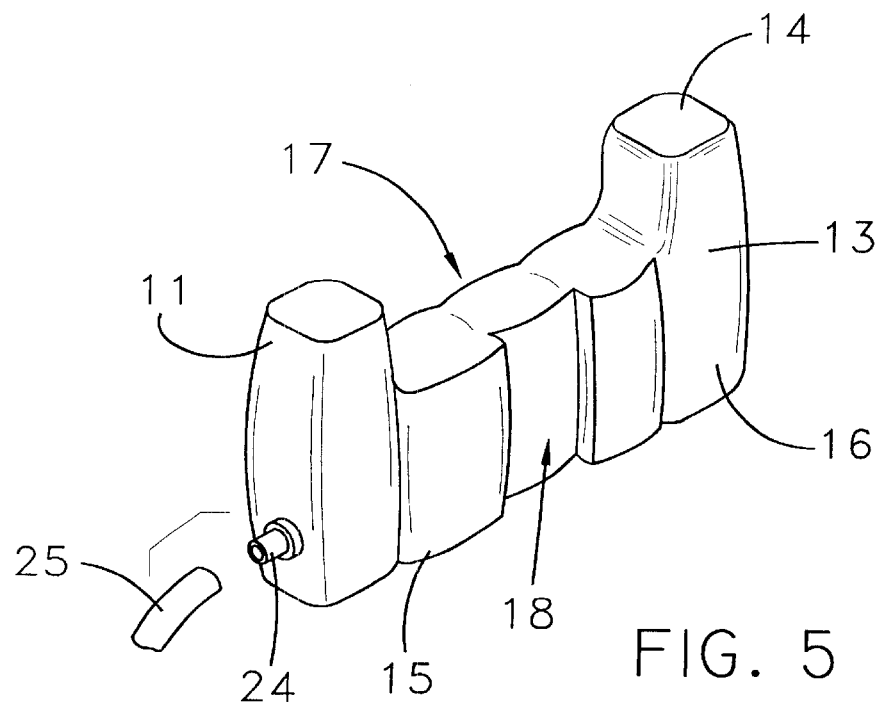
FIG. 5 is a rear perspective view of the second embodiment of the present invention.
Figure 6:
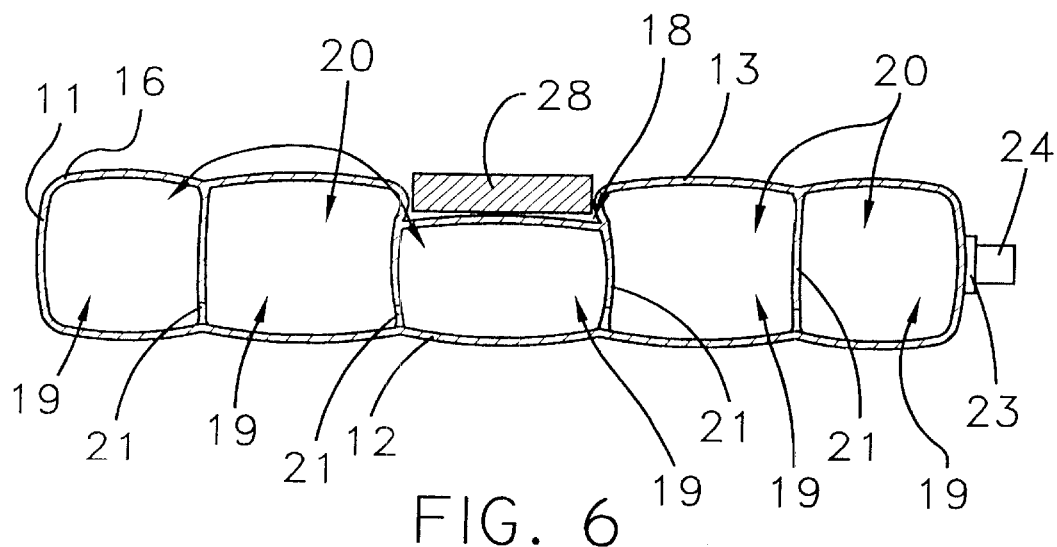
FIG. 6 is a cross-sectional view of the present invention.

With reference now to the drawings, and in particular to FIGS. 1 through 6 thereof, a new neck support device for a vehicle car seat embodying the principles and concepts of the present invention and generally designated by the reference numeral 10 will be described.

As best illustrated in FIGS. 1 through 6, the neck support device for a vehicle car seat 10 generally comprises a pillow-like member 11 having a front 12, back 13, top 14, and bottom 15 and further having a definite thickness and being adapted to rest between a top of a vehicle car seat 27 and a vehicle head rest 26. The top 14 of the pillow-like member 11 includes a centrally-disposed recessed portion 17 which is adapted to removably receive the vehicle head rest 26 therein. The pillow-like member 11 further includes a vertical groove 18 being centrally disposed in the back 13 thereof and extending from the bottom 15 to the top 14 thereof. The vertical groove 18 is adapted to removably receive an elongate head rest support member 28 therein. The pillow-like member 11 also includes an outer layer of material 16 and a cavity 19 being disposed within the outer layer of material 16 with the cavity 19 being separated into chambers 20 with partitions of material 21. The neck support device for a vehicle seat 10 also comprises a means for cushioning the pillow-like member 11.

As a first embodiment, the means for cushioning, the pillow-like member includes foam material 22 being conventionally disposed in the chambers 20 of the cavity 19 of the pillow-like member 11.

As a second embodiment, the means for cushioning the pillow-like member 11 includes an air valve member 23 conventionally extending through the outer layer of material 16 and into one of the chambers 20 of the cavity 19 of the pillow-like member 11 with the chambers 19 being air tight and being adapted to receive air so that air cannot leak out of the chambers 20 except through the air valve member 23. The air valve member 23 includes a stem 24 being adapted to connect to an air supply member 25 for allowing air to enter and exit the chambers 20.

In use, the user extends the vehicle head rest 26 above the top of the vehicle car seat 27 and then places the pillow-like member 11 between the top of the vehicle car seat 27 and the vehicle head rest 26 with the head rest support member 28 being securely received in the vertical groove 18 and with the vehicle head rest 26 being received in the centrally-disposed recessed portion 17 to secure the pillow-like member 11 upon the vehicle car seat 27.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A neck support device for a vehicle car seat comprising:
   a pillow member having a front, back, top, and bottom and further having a thickness and being adapted to rest between a top of a vehicle car seat and a vehicle head rest; and
   a means for cushioning said pillow member;
   wherein said pillow member also includes an outer layer of material and a cavity being disposed between said outer layer of material, said cavity being separated into chambers with partitions of material; and
   wherein said means for cushioning said pillow member includes foam material being disposed in said chambers of said cavity of said pillow member.

2. A neck support device for a vehicle car seat as described in claim 1, wherein said top of said pillow member includes a centrally-disposed recessed portion which is adapted to removably receive the vehicle head rest therein.

3. A neck support device for a vehicle car seat as described in claim 1, wherein said pillow member further includes a vertical groove being centrally disposed in said back thereof and extending from said bottom to said top thereof, said vertical groove being adapted to removably receive an elongate head rest support member therein.

4. A neck support device for a vehicle car seat comprising:
   a pillow member having a front, back, top, and bottom and further having a definite thickness and being adapted to rest between a top of a vehicle car seat and a vehicle head rest, said top of said pillow member including a centrally-disposed recessed portion which is adapted to removably receive the vehicle head rest therein, said pillow member further including a vertical groove being centrally disposed in said back thereof and extending from said bottom to said top thereof, said vertical groove being adapted to removably receive an elongate head rest support member therein, said pillow member also including an outer layer of material and a cavity being disposed between said outer layer of material, said cavity being separated into chambers with partitions of material; and a means for cushioning said pillow member.

5. A neck support device for a vehicle seat as described in claim 4, wherein said means for cushioning said pillow member includes foam material being disposed in said chambers of said cavity of said pillow member.

6. A neck support device for a vehicle car seat as described in claim 4, wherein said means for cushioning said pillow member includes an air valve member extending through said outer layer of material and into one of said chambers of said cavity of said pillow member, said chambers being air tight and being adapted to receive air so that air cannot leak out of said chambers except through said air valve member, said air valve member including a stem being adapted to connect to an air supply member for allowing air to enter and exit said chambers.

7. A neck support device for a vehicle car seat comprising:

a pillow member for positioning between a top of a vehicle car seat and a vehicle head rest, said pillow member having a front, a back, a top, and a bottom and further having a thickness; and a means for cushioning said pillow member;

wherein said pillow member also includes an outer layer of material and a cavity being disposed between said outer layer of material, said cavity being separated into chambers with partitions of material; and wherein said pillow member further includes a vertical groove for removably receiving an elongate head rest support member therein, said vertical groove being disposed in said back thereof and extending from said bottom to said top thereof;

wherein said top of said pillow member includes a centrally-disposed recessed portion for removably receiving a portion of the vehicle head rest therein.

8. A neck support device for a vehicle car seat as described in claim 7, wherein said means for cushioning said pillow member includes an air valve member extending through said outer layer of material and into one of said chambers of said cavity of said pillow member, said chambers being air tight and being adapted to receive air so that air cannot leak out of said chambers except through said air valve member.

9. A neck support device for a vehicle car seat as described in claim 8, wherein said air valve member includes a stem being adapted to connect to an air supply member for allowing air to enter and exit said chambers.

* * * * *